(12) United States Patent
Yoon et al.

(10) Patent No.: US 8,502,793 B2
(45) Date of Patent: *Aug. 6, 2013

(54) TOUCH SCREEN DISPLAY DEVICE AND METHOD OF MANUFACTURING THE SAME

(75) Inventors: Soo-Wan Yoon, Suwon-si (KR);
Cheol-Woo Park, Suwon-si (KR);
Sung-Jin Kim, Seongnam-si (KR);
Nam-Seok Roh, Seongnam-si (KR);
Sang-Il Kim, Yongin-si (KR); Woo-Jae Lee, Yongin-si (KR); Chong-Chul Chai, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 170 days.

This patent is subject to a terminal disclaimer.

(21) Appl. No.: 13/024,658

(22) Filed: Feb. 10, 2011

(65) Prior Publication Data
US 2011/0128253 A1    Jun. 2, 2011

Related U.S. Application Data

(63) Continuation of application No. 11/682,394, filed on Mar. 6, 2007, now Pat. No. 7,907,126.

(30) Foreign Application Priority Data

Aug. 25, 2006  (KR) .................................. 2006-80893

(51) Int. Cl.
*G06F 3/041* (2006.01)

(52) U.S. Cl.
USPC ............................................ 345/173; 345/107

(58) Field of Classification Search
USPC .......................................... 345/173–181, 107
See application file for complete search history.

(56) References Cited

U.S. PATENT DOCUMENTS

| 7,158,129 B2 * | 1/2007 | Nakajima ...................... 345/207 |
| 2005/0266590 A1 * | 12/2005 | Roh et al. ...................... 438/22 |

FOREIGN PATENT DOCUMENTS

| KR | 1020050019799 A | 3/2005 |
| KR | 1020060009602 A | 2/2006 |

* cited by examiner

*Primary Examiner* — Duc Dinh
(74) *Attorney, Agent, or Firm* — F. Chau & Associates, LLC

(57) ABSTRACT

A touch screen display device includes a common electrode, a base substrate disposed opposite to the common electrode, a display signal line formed on the base substrate, a plurality of pixel electrodes, a touch position sensing part formed between the base substrate and the pixel electrodes, the touch position sensing part sensing a change of electrostatic capacitance formed between the common electrode and the touch position sensing part, and a display layer disposed between the common electrode and the pixel electrodes. The display layer includes a plurality of micro capsules comprising positively charged pigment particles and negatively charged pigment particles.

15 Claims, 11 Drawing Sheets

TOUCH SCREEN DISPLAY DEVICE AND METHOD OF MANUFACTURING THE SAME

CROSS-REFERENCE TO RELATED APPLICATIONS

This application is a Continuation Application of U.S. patent application Ser. No. 11/682,394, filed Mar. 6, 2007 now U.S. Pat. No. 7,907,126, which claims priority under 35 U.S.C. §119 of Korean Patent Application No. 2006-80893 filed on Aug. 25, 2006, the contents of which are incorporated by reference herein in their entirety.

BACKGROUND OF THE INVENTION

1. Technical Field

The present disclosure relates to a display device and, more particularly, to a touch screen display device and a method of manufacturing the touch screen display device.

2. Discussion of Related Art

A touch panel is a display device that accepts user input commands via a touch sensitive screen on the panel. The touch panel is disposed at the display surface side of the display device to be touched by hands, fingertips or other objects such as a stylus. The touch panel detects a touch position and receives the selected instruction in the touch position as an input signal. The touch panel may substitute for input devices, such as a keyboard or mouse.

Liquid crystal display devices using liquid crystal panels are widely used as display devices. A liquid crystal display device in which a touch panel is stacked upon a liquid crystal display panel has been developed. Methods for fabricating touch-panel integrated liquid crystal display devices include a resistor film method, an optical sensing method and an electrostatic capacitor method.

In conventional methods for embedding the functionality of the touch panel in the liquid crystal display panel, the manufacturing processes and the structure of the panel are complicated. Improving touch sensitivity for sensing a touch force applied to the touch panel has become an issue. Particularly, there has been a limit to the increase in the area of electrodes that form electrostatic capacitance in an electrostatic capacitor type touch screen display device to improve sensitivity of sensing.

There is a need for improved touch sensitivity in touch screen display devices.

SUMMARY OF THE INVENTION

According to an exemplary embodiment of the present invention, a touch screen display device includes a common electrode, a base substrate disposed opposite to the common electrode, a display signal line formed on the base substrate, a plurality of pixel electrodes electrically connected with the display signal line, a touch position sensing part formed between the base substrate and the pixel electrodes, the touch position sensing part sensing a change of electrostatic capacitance formed between the common electrode and the touch position sensing part, and a display layer disposed between the common electrode and the pixel electrodes. The display layer includes a plurality of micro capsules comprising positively charged pigment particles and negatively charged pigment particles.

The display signal line may include a gate line and a data line that intersect each other on the base substrate to define a unit pixel area in which each of the pixel electrodes is disposed. A touch screen display device may include a thin film transistor electrically connected with the gate line and the data line to switch a pixel voltage to be applied to the pixel electrode.

The touch position sensing part may be disposed between the base substrate and the pixel electrodes. The touch position sensing part may include a first sensing line and a second sensing line. The first sensing line may be extended substantially parallel with the gate line. The first sensing line may include a first sensing electrode formed in the unit pixel area. The first sensing electrode and the common electrode may form a first electrostatic capacitance. The second sensing line may be extended substantially parallel with the data line. The second sensing line may include a second sensing electrode formed in the unit pixel area. The second sensing electrode and the common electrode may form a second electrostatic capacitance.

According to an exemplary embodiment of the present invention, a touch screen display device includes a position data processing part electrically connected with the first and second sensing lines, wherein the position data processing part detects position data of a point on the touch screen display device indicating a point touched by an external object using signals transmitted from the first and second sensing lines. The first sensing line may be formed at the same layer as the gate line, and the second sensing line may be formed at the same layer as the data line.

A touch screen display device may include a gate insulating layer, a channel protecting layer, a first protecting film and a second protecting film. The gate insulating layer covers the gate line and the first sensing line. The channel protecting layer covers the data line, the second sensing line and the thin film transistor. The common electrode may be formed on a surface of the first protecting film. The second protecting film is disposed between the pixel electrode and the display layer, to protect the micro capsules. The data line and the pixel electrode may be formed with the same material.

The first sensing line and the second sensing line may be disposed to cross over the unit pixel area. Each of the first sensing electrode and the second sensing electrode may overlap the pixel electrode. The first sensing electrode and the second sensing electrode may partially overlap each other. The first sensing electrode and the second sensing electrode may be separated from each other in the unit pixel area. A number of the micro capsules disposed in the unit pixel area may be in a range of about 20 to 100.

The touch screen display device may include a panel driving part. The panel driving part applies a gate signal and a data signal to the thin film transistor, and electrophoreses the pigment particles. The touch screen display device may include a short point formed in the base substrate. The short point transmits a common voltage outputted from the panel driving part to the common electrode.

According to an exemplary embodiment of the present invention, a method of manufacturing a touch screen display device includes forming a display signal line and a position sensing line disposed along the display signal line on a base substrate, forming a plurality of pixel electrodes electrically connected to the display signal line; and laminating a display plate on the base substrate such that the pixel electrodes and a bottom surface of a display layer face each other, wherein the display plate includes: the display layer including a plurality of micro capsules comprising positively charged pigment particles and negatively charged pigment particles; and a common electrode formed on a top surface of the display layer.

The display signal line and the position sensing line may be formed by forming a gate line and a first sensing line extended substantially parallel with the gate line on the base substrate, and forming a data line and a second sensing line extended substantially parallel with the data line. The data line intersects with the gate line, and is insulated from the gate line. The step of forming the display signal line and the position sensing line may include forming a gate insulating layer covering the gate line and the first sensing line, forming a semiconductor layer on the gate insulating layer correspondingly to a position of a gate electrode protruding from the gate line, and forming a channel protecting layer covering a source electrode and a drain electrode that protrudes from the data line to overlap the semiconductor layer.

When pixel electrodes are formed, the pixel electrodes may be formed on the channel protecting layer and may comprise a transparent conductive material or a metal. The pixel electrodes may be formed on the gate insulating layer with the same material as the data line.

According to an exemplary embodiment of the present invention, a method of manufacturing a touch screen display device a touch screen display device includes forming a position data processing part. The position data processing part is electrically connected with the first and second sensing lines, and detects position data of a point on the touch screen display device indicating a point touched by an external object using signals transmitted from the first and second sensing lines.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
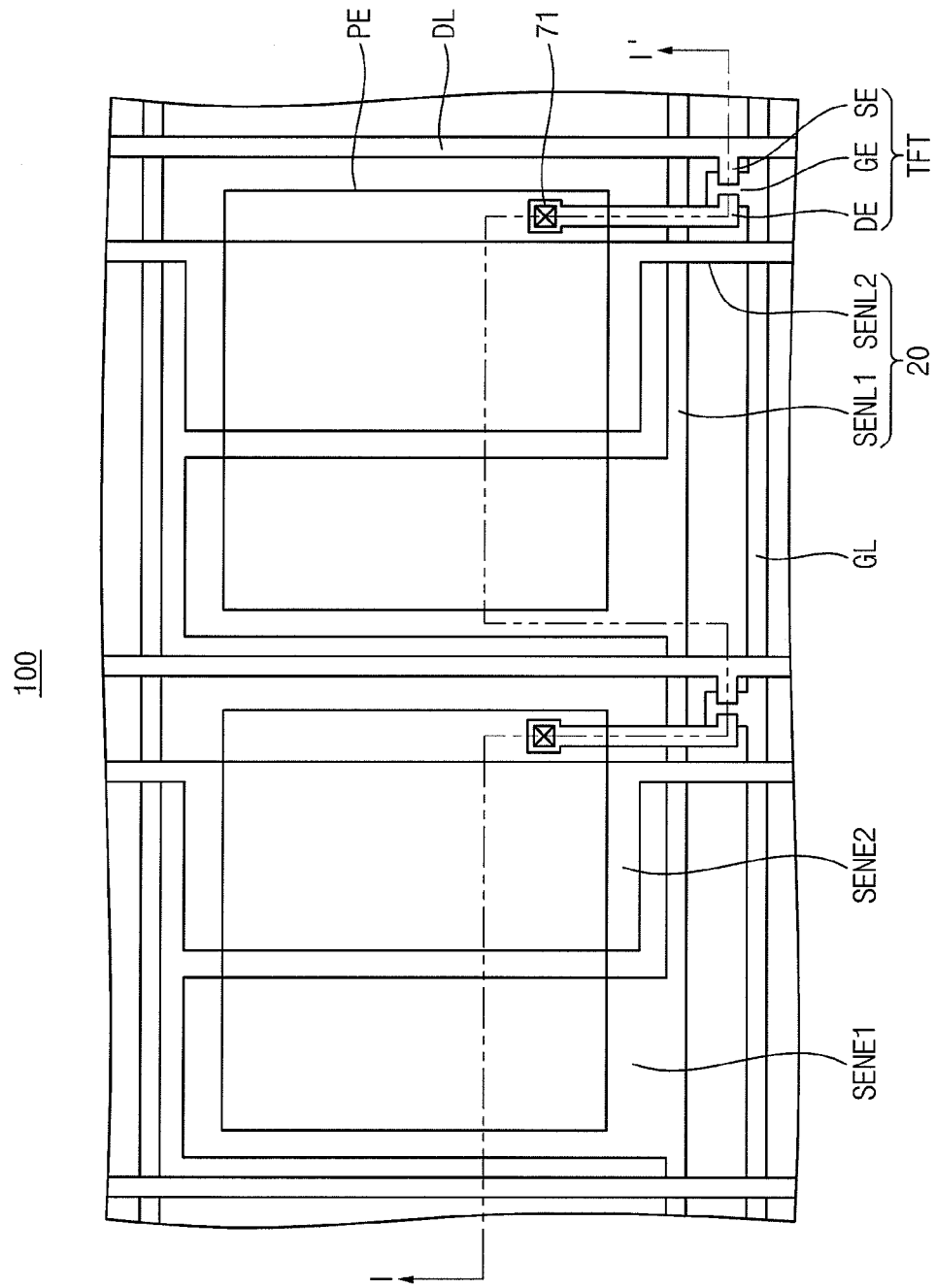
FIG. 1 is a plan view illustrating a touch screen display device according to an exemplary embodiment of the present invention.

Hereinafter, exemplary embodiments of the present invention will be described with reference to the accompanying drawings. It will be understood that when an element is referred to as being "on" or "onto" another element, it may be directly on the other element or intervening elements may also be present. Like reference numerals refer to similar or identical elements throughout the description of the exemplary embodiments.

Figure 2:
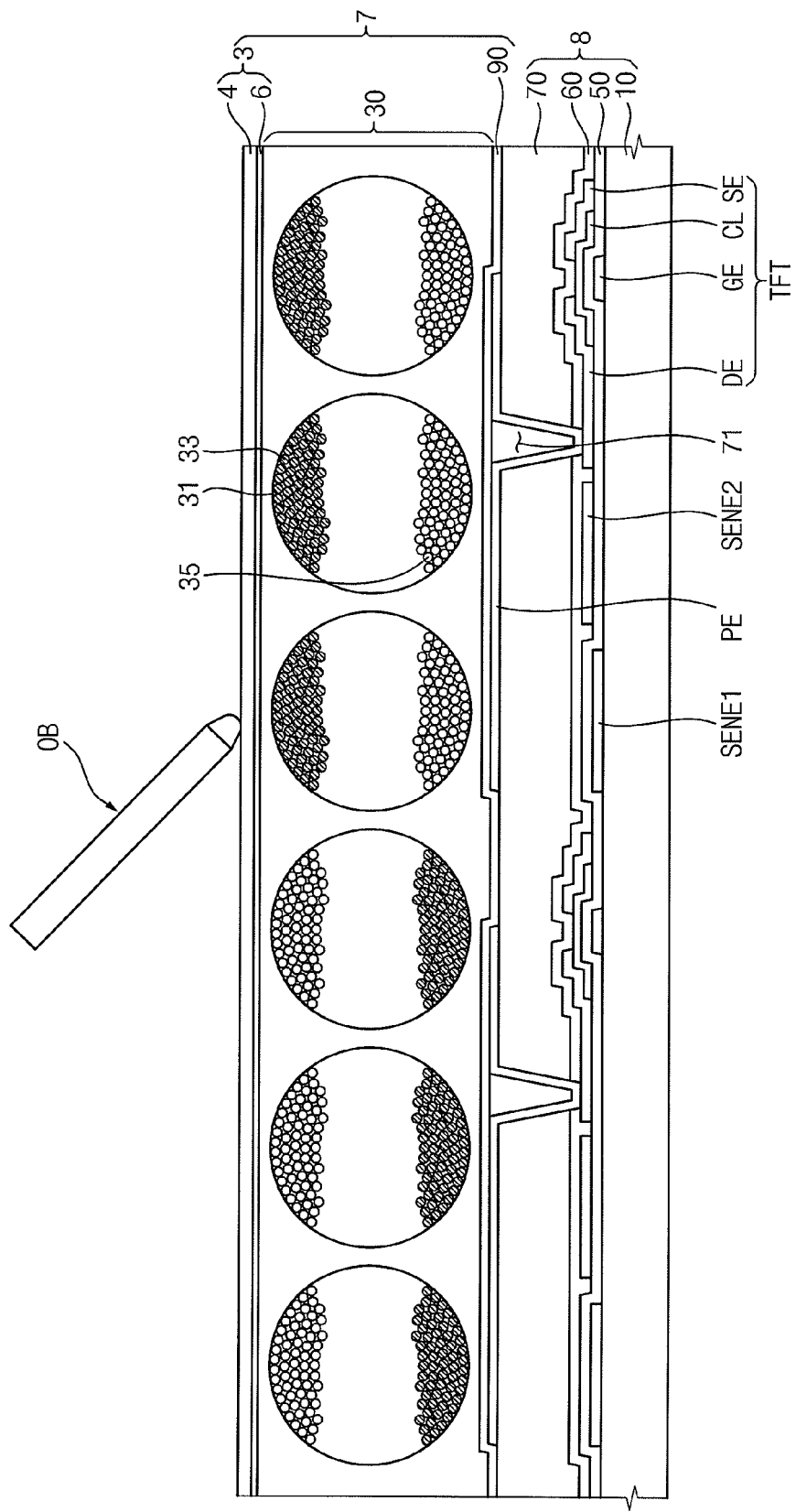
FIG. 2 is a cross-sectional view taken along a line I-I' in FIG. 1.

FIG. 1 is a plan view illustrating a touch screen display device according to an exemplary embodiment of the present invention. FIG. 2 is a cross-sectional view taken along a line I-I' in FIG. 1.

Referring to FIGS. 1 and 2, the touch screen display device 100 is an electrophoretic display device with a built-in touch panel. The touch screen display device 100 includes a common electrode 6, a base substrate 10, a plurality of pixel electrodes PE, a touch position sensing part 20, and a display layer 30.

The touch screen display device 100 may include a first protecting film 4 on which the common electrode 6 may be formed. The first protecting film 4 may be a plastic film, which may have superior optical transmittance, thermal resistance, chemical resistance, mechanical strength, etc.

The common electrode 6 may be formed over the entire surface of the first protecting film 4, for example, in a form of a thin film transistor. The common electrode 6 may include a transparent conductive material, such as for example, indium tin oxide (ITO), indium zinc oxide (IZO), and/or amorphous indium tin oxide (a-ITO). A predetermined voltage, such as a common voltage with a uniform level, is applied to the common electrode 6.

For ease of description, a "front plate" refers to a portion of the touch screen display device 100 comprising the first protecting film 4 and the common electrode 6. An image may be displayed on the front plate 3. The front plate 3 functions as a user input window for receiving a user's commands inputted by touching a predetermined point of an image displayed in the window.

Referring to FIG. 2, the base substrate 10 is disposed opposite to the front plate 3 so as to face each of the common electrodes 6. The base substrate 10 may be, for example, a glass substrate, which may be used as a thin film transistor substrate of a liquid crystal display device.

A display signal line is formed on the base substrate 10. The display signal line includes a plurality of gate lines GL transmitting a gate signal (also called a "scanning signal") and a plurality of data lines DL transmitting a data signal.

The gate lines GL, which are extended in a row direction in FIG. 1, are formed substantially parallel with each other. The gate lines GL may include silver (Ag) or silver alloy, which has relatively lower resistivity. The gate lines GL may include silver (Ag) or silver alloy (Ag-alloy) of a single layer, and may further include other layer(s) comprising materials such as chromium (Cr), titanium (Ti), tantalum (Ta), which may have superior physical and electrical properties.

A gate insulating layer 50 including an insulating material such as silicon nitride (SiNx) is formed on the base substrate 10. The gate insulating layer 50 covers the gate line GL and an electrode GE protruding in a column direction from the gate line GL.

A gate active layer CL is formed on the gate insulating layer 50 to correspond to a position of the gate electrode GE. In an exemplary embodiment of the present invention, the gate active layer CL includes a semiconductor layer and a resistant contact layer. The semiconductor layer forms a channel part of a thin film transistor TFT. The semiconductor layer may include, for example, amorphous silicon or poly crystalline silicon. The resistant contact layer is divided into both sides of the semiconductor layer. The resistant contact layer may include, for example, a silicide or n+ hydrogenated amorphous silicon doped in a high concentration with n-type dopants.

A plurality of data lines DL, a plurality of source electrodes SE and a plurality of drain electrodes DE are formed on the base substrate 10 on which the resistant contact layer is formed. The source electrode SE protrudes from the data line DL. The drain electrode DE is disposed opposite to the source electrode SE and separately therefrom.

The data lines DL, which are extended in a column direction in FIG. 1, are formed substantially perpendicular to the gate lines GL. The data lines DL are formed substantially parallel with each other and intersect with the gate lines GL to define a plurality of unit pixel areas.

The data lines DL, the source electrodes SE and the drain electrodes DE may include silver or silver alloy, or may include other conductive materials, for which a contact property may be superior. As shown in FIG. 2, the source electrodes SE and the drain electrodes DE are disposed opposite to each other with the gate electrode GE disposed between them, and at least a portion of each of the source and drain electrodes is disposed over the gate active layer CL.

Each of the unit pixel areas defined by the gate lines GL and the data lines DL includes a pixel electrode PE.

A plurality of the unit pixel areas is formed in a matrix form. The gate electrode GE, the gate insulating layer 50, the gate active layer CL, the source electrode SE and the drain electrode DE form the thin film transistor TFT.

A channel protecting layer 60 may be formed on the data line DL, the source electrode SE and the drain electrode DE. The channel protecting layer 60 may include, for example, silicon oxide, silicon nitride, etc. An organic layer 70 may be formed on the channel protecting layer 60 to protect the thin film transistor TFT and may provide a flat surface.

In an exemplary embodiment of the present invention, the pixel electrode PE is formed on the organic layer 70 in each of the unit pixel areas. A contact hole 71 exposing a portion of the drain electrode DE is formed at the channel protecting layer 60 and the organic layer 70. The pixel electrode PE is extended to the contact hole 71 to be electrically connected with the drain electrode DE. The thin film transistor TFT switches a pixel voltage applied to the pixel electrode PE.

The touch screen display device 100 is an electrophoretic indication display, which uses an externally provided light. The pixel electrode PE may be formed with a transparent conductive material, such as the same material as used in the common electrode 6. The pixel electrode PE may also include a metal. For example, the pixel electrode PE may be formed with the same metal as used in the data lines DL or the gate lines GL.

A touch position sensing part 20 is formed between the base substrate 10 and the pixel electrode PE. The touch position sensing part 20 and the common electrode 6 form an electrostatic capacitance. When an external object OB contacts the front plate 3, a separation interval between the common electrode 6 and the touch position sensing part 20 is changed, in which case the electrostatic capacitance formed between the common electrode 6 and the touch position sensing part 20 is also changed. The touch position sensing part 20 detects the change of the electrostatic capacitance.

The touch position sensing part 20 includes a first sensing line SENL1, which may be extended substantially parallel with the gate line GL, and a second sensing line SENL2, which may be extended substantially parallel with the data lines DL. In an exemplary embodiment of the present invention, the touch screen display device 100 obtains a row-coordinate value of a touch position from the first sensing line SENL1 and obtains a column-coordinate value of a touch position from the second sensing line SENL2.

The first sensing line SENL1 may include a first sensing electrode SENE1, and the second sensing line SENL2 may include a second sensing electrode SENE2. The first sensing electrode SENE1 and the second sensing electrode SENE2 may be disposed in the unit pixel area to overlap the pixel electrode PE. The first sensing electrode SENE1 and the second sensing electrode SENE2 may partially overlap each other, or may be separated from each other as illustrated in FIG. 1.

A sensing voltage may be applied to each of the first sensing electrode SENE1 and the second sensing electrode SENE2. The first sensing electrode SENE1 and the common electrode 6 form a first electrostatic capacitance, and the second sensing electrode SENE2 and the common electrode 6 form a second electrostatic capacitance.

In an exemplary embodiment of the present invention, a thin film transistor substrate 8 comprises a substrate including the base substrate 10, the organic layer 70 and above-mentioned elements disposed between the base substrate 10 and the organic layer 70.

The display layer 30 is disposed between the front plate 3 and the thin film transistor substrate 8. For example, the display layer 30 may be disposed between the common electrode 6 and the organic layer 70. The touch screen display device 100 may include a second protecting film 90 disposed between the organic layer 70 and the display layer 30. The display layer 30 may include a plurality of micro capsules 31 (also called "electric ink").

The micro capsule 31 may be, for example, about a few hundred micrometers (μm) in diameter. The micro capsule 31 may have a ball shape.

The micro capsules 31 include negatively charged pigment particles 33, referred to herein as negative pigment particles, and positively charged pigment particles 35, referred to herein as positive pigment particles. For example, the negative pigment particles 33 may be black, and the positive pigment particles 35 may be white. When an electric field is not generated between the common electrode 6 and the pixel electrode PE, the charged pigment particles 33 and 35 may be mixed in a fluid.

For ease of description, a "display plate" 7 refers to a portion of the touch screen display device 100 comprising the first protecting film 4, the common electrode 6, the display layer 30 and the second protecting film 90. The display plate 7 may be laminated on the thin film transistor substrate 8.

Figure 3:
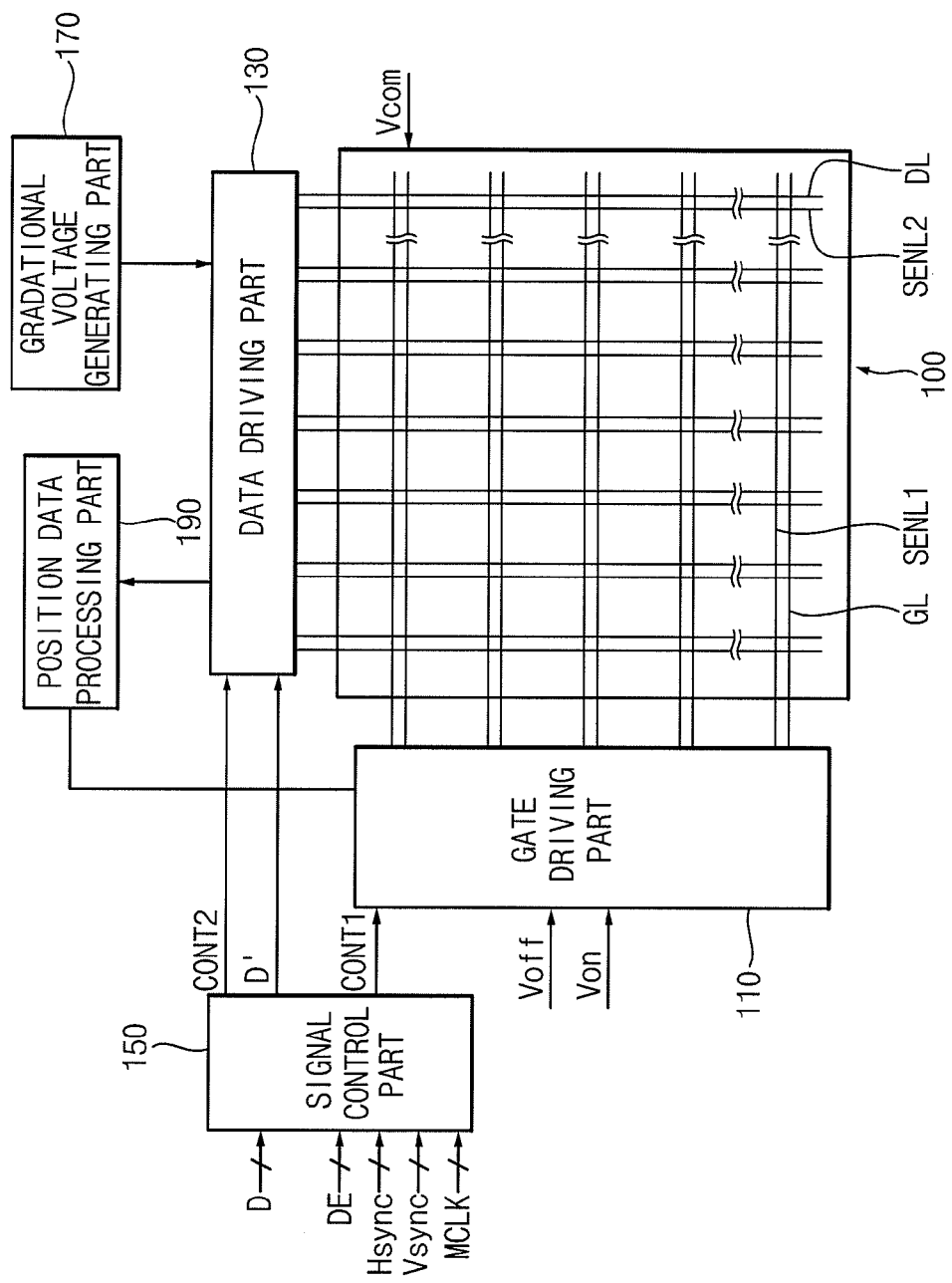
FIG. 3 is a block diagram illustrating the touch screen display device of FIG. 1, according to an exemplary embodiment of the present invention.

FIG. 3 is a block diagram illustrating the touch screen display device of FIG. 1, according to an exemplary embodiment of the present invention.

Referring to FIG. 3, the touch screen display device 100 may include a panel driving part that applies a gate signal and a data signal to the thin film transistor TFT to electrophorese the charged pigment particles 33 and 35. The panel driving part may include a gate driving part 110, a data driving part 130, a gradational voltage generating part 170 and a signal control part 150. The gradational voltage generating part 170 is electrically connected with the data driving part 130.

The gate driving part 110 applies the gate signal to the gate line GL. The gate signal may include a combination of a gate-on voltage Von and a gate-off voltage Voff that are transmitted from an external source.

The gradational voltage generating part 170 may generate a first gradational voltage and a second gradational voltage. The first gradational voltage has a positive value to a common voltage Vcom, and the second gradational voltage has a negative value to the common voltage Vcom.

The data driving part 130 may include, for example, a shift resistor, a latch circuit, a digital-to-analog converter DAC and/or an output buffer. The data driving part 130 selects the gradational voltage generated from the gradational voltage generating part 170 to produce a data signal. The data driving part 130, which is electrically connected with the data lines DL, applies the data signal to the data lines DL. A plurality of the data driving parts 130 may be formed as an integrated circuit.

The signal control part 150 produces a control signal for controlling the gate driving part 110 and the data driving part 130, and provides the gate driving part 110 and the data driving part 130 with the control signal.

The data driving part 130 and the gate driving part 110 may be integrated on the base substrate 10. The data driving part 130 and the gate driving part 110 may be formed as a chip and mounted on the base substrate 10. A short point for applying the common voltage Vcom generated from the panel driving part to the common electrode 6 may be formed on the base substrate 10.

The touch screen display device 100 may include a position data processing part 190 electrically connected with the first sensing line SENL1 and the second sensing line SENL2. The position data processing part 190 may be disposed on the base substrate 10. The position data processing part 190 may be may be disposed separately from the base substrate 10.

Figure 4:
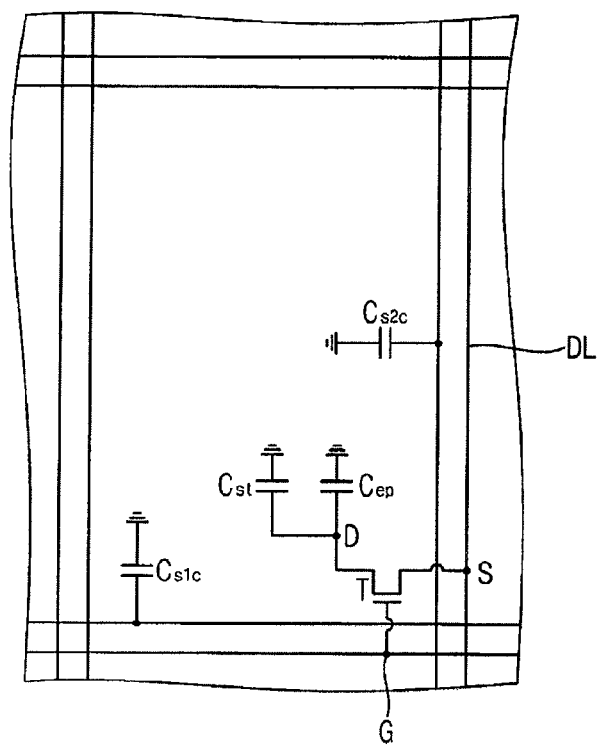
FIG. 4 is an equivalent circuit diagram illustrating the unit pixel of the touch screen display device of FIG. 3, according to an exemplary embodiment of the present invention.

FIG. 4 is an equivalent circuit diagram illustrating the unit pixel of the touch screen display device of FIG. 3, according to an exemplary embodiment of the present invention.

Referring to FIGS. 3 and 4, the unit pixel includes a thin film transistor, a electrophoretic capacitor Cep, a first sensing signal capacitor Cs1c and a second sensing signal capacitor Cs2c. The unit pixel may include a storage capacitor Cst. The first sensing signal capacitor Cs1c may include the common electrode 6 and the first sensing electrode SENE1. The second sensing signal capacitor Cs2c may include the common electrode 6 and the second sensing electrode SENE2.

When an external object OB contacts the front plate 3, a separation interval between the common electrode 6 and the first sensing electrode SENE1 is reduced, and the first electrostatic capacitance is changed. Likewise, a separation interval between the common electrode 6 and the second sensing electrode SENE2 is reduced, and the second electrostatic capacitance is changed. In this case, a change of a voltage level may occur in the first sensing electrode SENE1 and the second sensing electrode SENE2. Using the change of the voltage level information, the position data processing part 190 detects the position data of a point on the touch screen display device 100 indicating a point touched by the external object OB.

Figure 5:
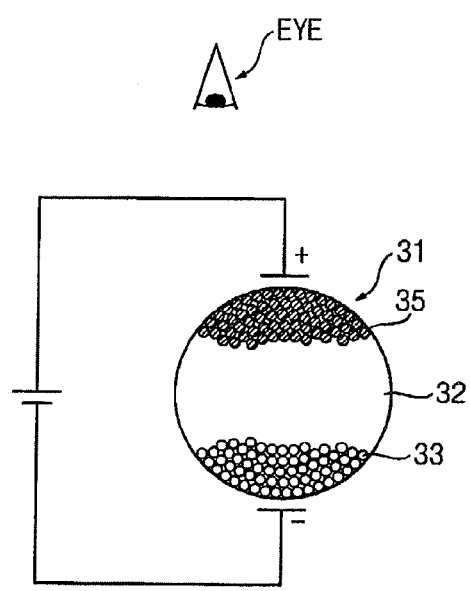
FIG. 5 is a simplified diagram illustrating a driving mechanism of a touch screen display device according to an exemplary embodiment of the present invention.

FIG. 5 is a simplified diagram illustrating a driving mechanism of a touch screen display device according to an exemplary embodiment of the present invention.

Referring to FIGS. 2 and 5, when a voltage is not applied to the common electrode 6 and the pixel electrode PE, the negative pigment particles 33 and the positive pigment particles 35 of the micro capsule 31 are mixed. When a pixel voltage is applied to the pixel electrode PE and a common voltage is applied to the common electrode 6, an electric field is generated between the common electrode 6 and the pixel electrode PE. The pigment particles 33 and 35 are separated by the electric field and respectively migrate to each electrode having an opposite polarity. In such case, an observer viewing the touch screen display device 100 may see an image in black and white.

For example, as illustrated in FIG. 2, a pixel voltage that is positive with respect to the common voltage Vcom is applied to a pixel electrode PE of some unit pixel area, and a pixel voltage that is negative with respect to the common voltage Vcom is applied to a pixel electrode PE of some unit pixel area. In the unit pixel area to which the positive pixel voltage is applied, the black, negatively charged pigment particles 33 are attracted to and cluster around the pixel electrode PE, and the white, positively charged pigment particles 35 are attracted to and cluster around the common electrode 6. On the other hand, in the unit pixel area to which the negative pixel voltage is applied, the white, positively charged pigment particles 35 cluster around the pixel electrode PE, and the black, negatively charged pigment particles 33 cluster around the common electrode 6.

Because of a characteristic of the micro capsule 31 or electric ink, an image may be sustained for a long time even after the electric field generated between the common electrode 6 and the pixel electrode PE decreases. In such case, the touch screen display device 100 may consume less electric power. The display layer 30 has higher reflectivity and increased contrast, and a disparity between viewing angles of the touch screen display device 100 may be lessened, and a wider viewing angle may be achieved.

Figure 6:
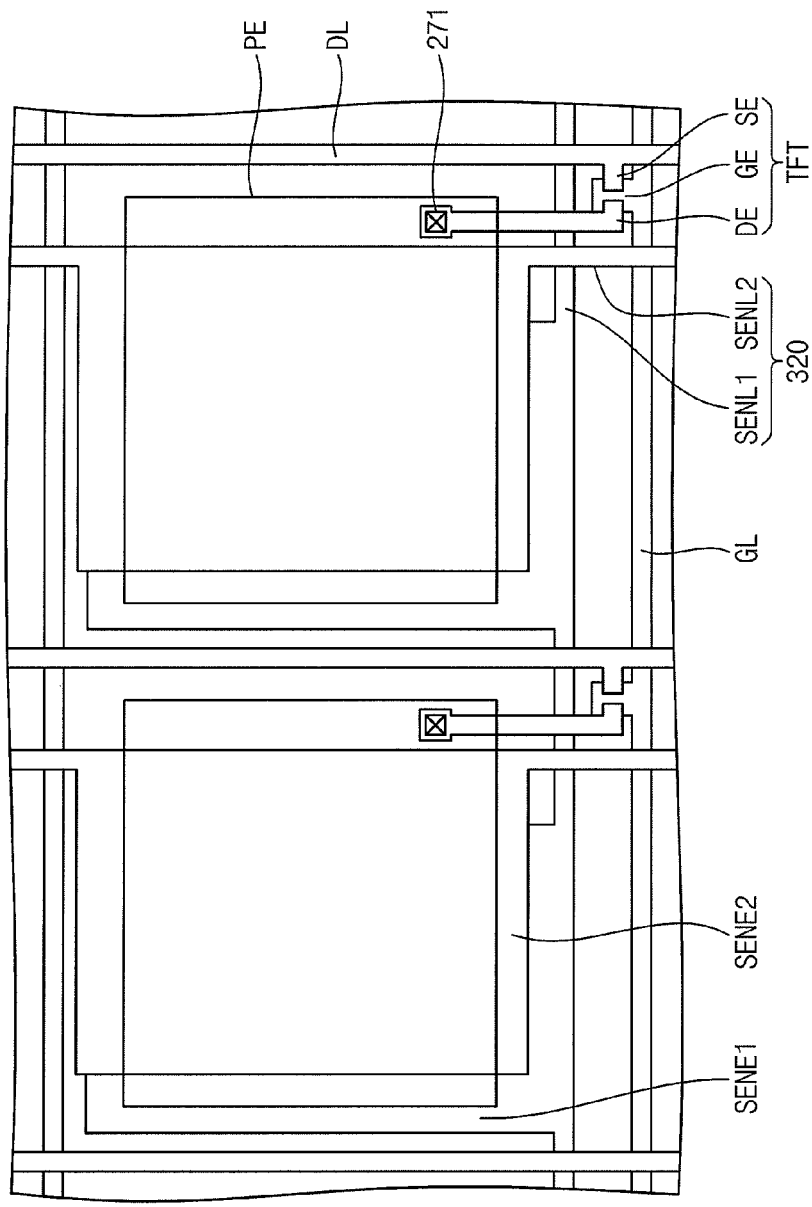
FIG. 6 is a plan view illustrating a touch screen display device according to an exemplary embodiment of the present invention.

FIG. 6 is a plan view illustrating a touch screen display device according to an exemplary embodiment of the present invention.

Referring to FIG. 6, the touch screen display device 300 includes a front plate on which a common electrode is formed, a base substrate on which displaying signal lines are formed, a plurality of pixel electrodes PE, a touch position sensing part 320, and a display layer. The touch screen display device 300 according to an exemplary embodiment of the present invention described in connection with FIG. 6 is substantially the same as the touch screen display device 100 shown in FIGS. 1 to 4 except for a first sensing electrode SENE1 and a second sensing electrode SENE2.

The first sensing electrode SENE1 and the second sensing electrode SENE2 are disposed in a unit pixel area to partially overlap the pixel electrode PE. The first sensing electrode SENE1 and the second sensing electrode SENE2 partially overlap each other. The area of the sensing electrode SENE1 and the area of the second sensing electrode SENE2 according to an exemplary embodiment of the present invention described in connection with FIG. 6 may be larger as compared with an exemplary embodiment of the present invention illustrated in FIG. 1, and the first electrostatic capacitance and the second electrostatic capacitance may be larger, and touch sensitivity may be improved.

Figure 7:
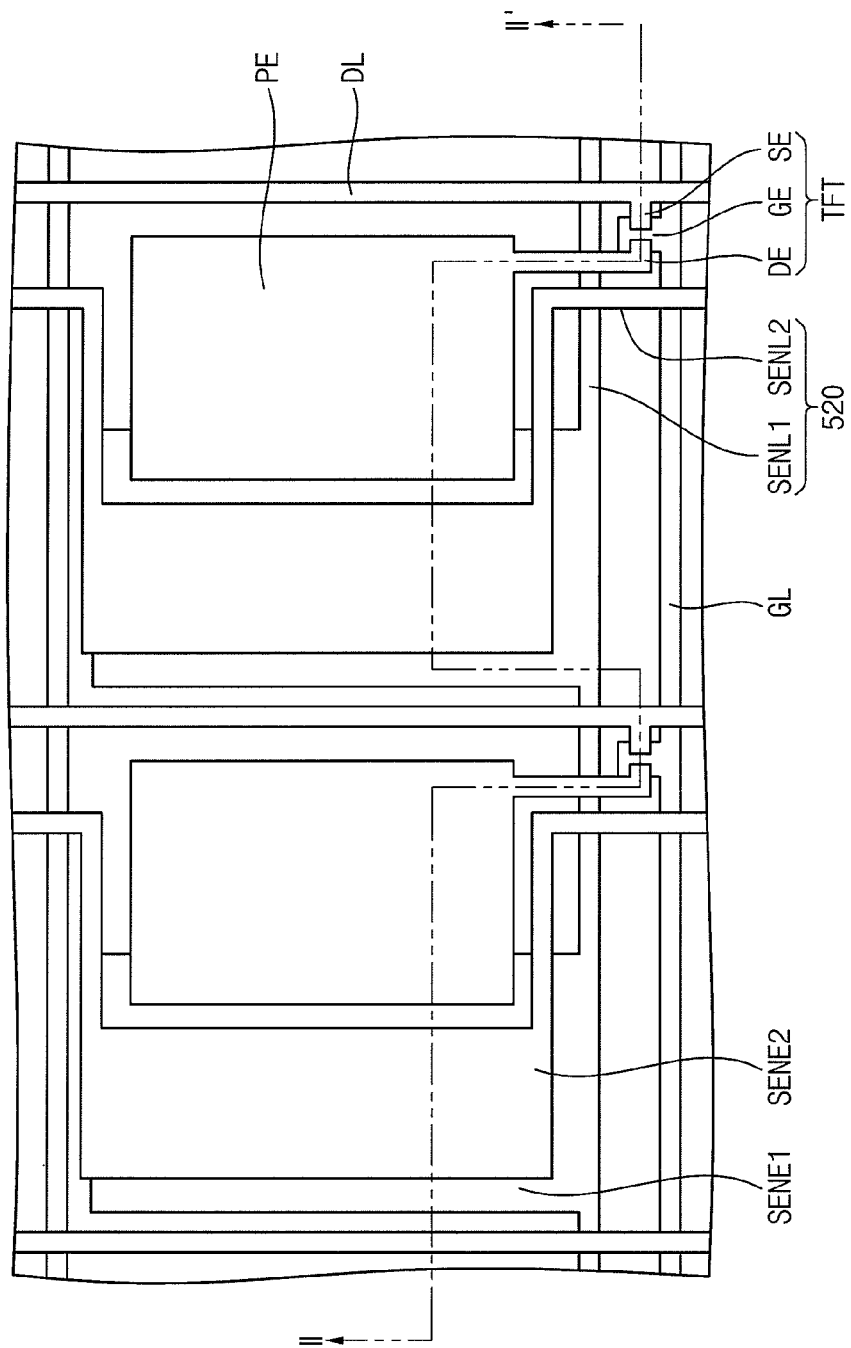
FIG. 7 is a plan view illustrating a touch screen display device according to an exemplary embodiment of the present invention.
Figure 8:
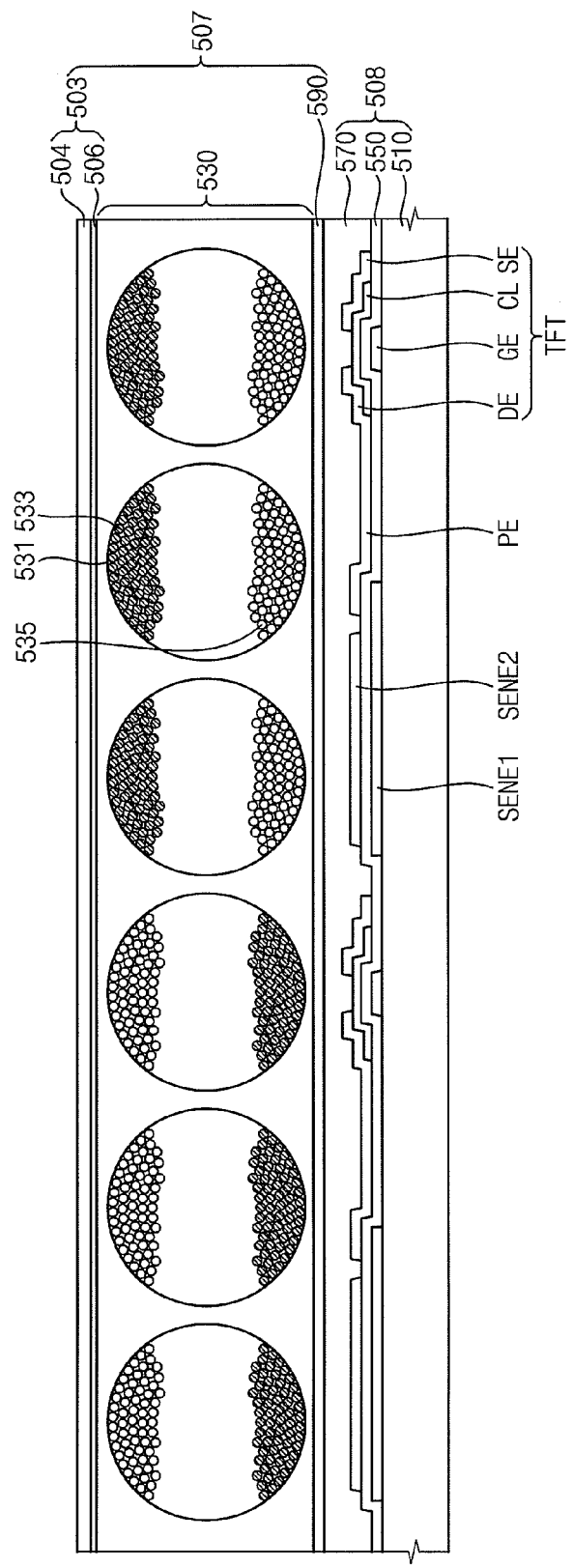
FIG. 8 is a cross-sectional view taken along a line II-II' in FIG. 7.

FIG. 7 is a plan view illustrating a touch screen display device according to an exemplary embodiment of the present invention. FIG. 8 is a cross-sectional view taken along a line II-II' in FIG. 7.

Referring to FIGS. 7 and 8, the touch screen display device 500 includes a front plate 503 on which a common electrode 506 is formed, a base substrate 510 on which displaying signal lines are formed, a plurality of pixel electrodes PE, a touch position sensing part 520, and a display layer 530. The touch screen display device 500 according to an exemplary embodiment of the present invention described in connection with FIGS. 7 and 8 is substantially the same as the touch screen display device 100 shown in FIGS. 1 to 4 except for a second sensing line SENL2, a drain electrode DE, a pixel electrode PE and an organic layer.

The pixel electrode PE may be formed on a gate insulating layer 550, for example, similar to a data line DL and a second sensing line SENL2. The pixel electrode PE may be integrally formed with a drain electrode DE. The pixel electrode PE may be formed with the same material as the data line DL and the second sensing line SENL2.

For preventing an electrical short between the pixel electrode PE and the second sensing line SENL2, the second sensing line SENL2 is formed to extend around the edges of the pixel electrode PE, as shown in FIG. 7, and the second sensing electrode SENE2 is formed in a region that the pixel electrode PE does not occupy in the unit pixel area. According to an exemplary embodiment of the present invention described in connection with FIGS. 7 and 8, the first sensing electrode SENE1 is formed to overlap each of the pixel electrode PE and the second sensing electrode SENE2, and a structure of the unit pixel layer may be simplified.

Figure 9:
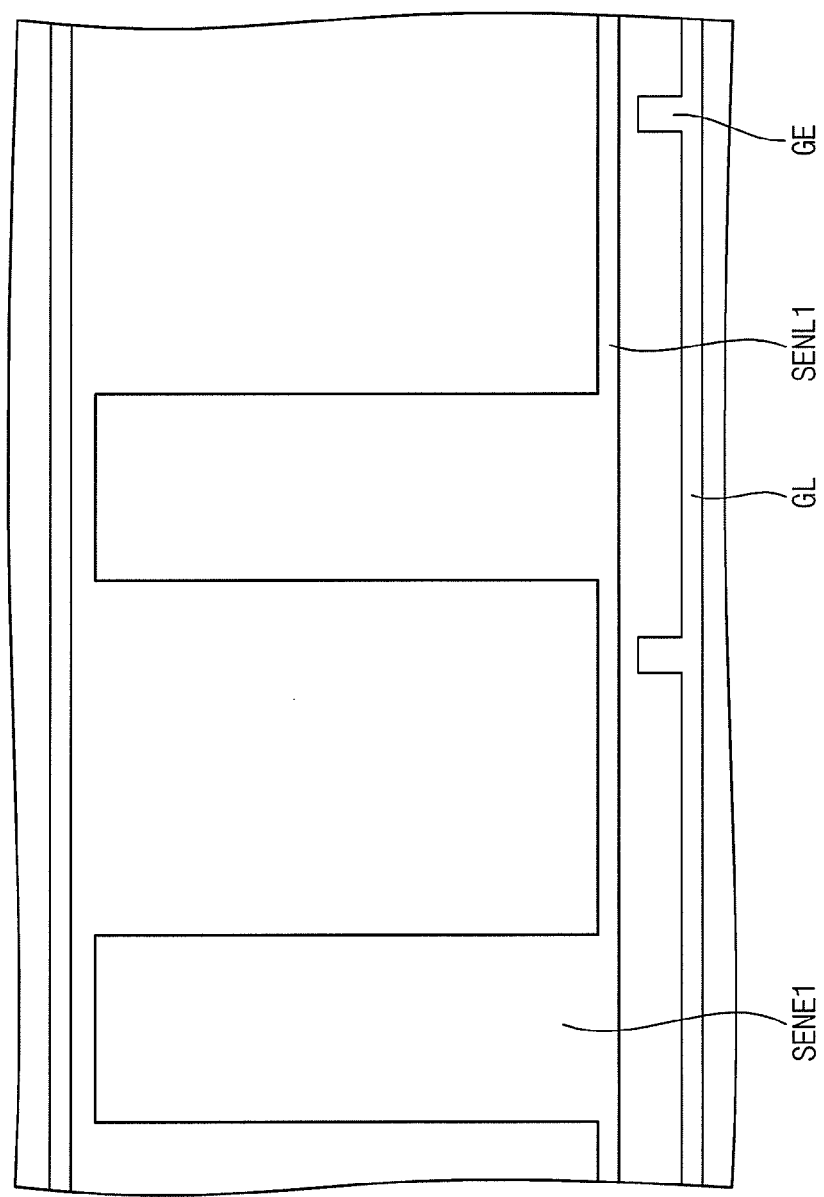
FIGS. 9, 10 and 11 are plan views for illustrating a method of manufacturing a touch screen display device according to an exemplary embodiment of the present invention.
Figure 10:
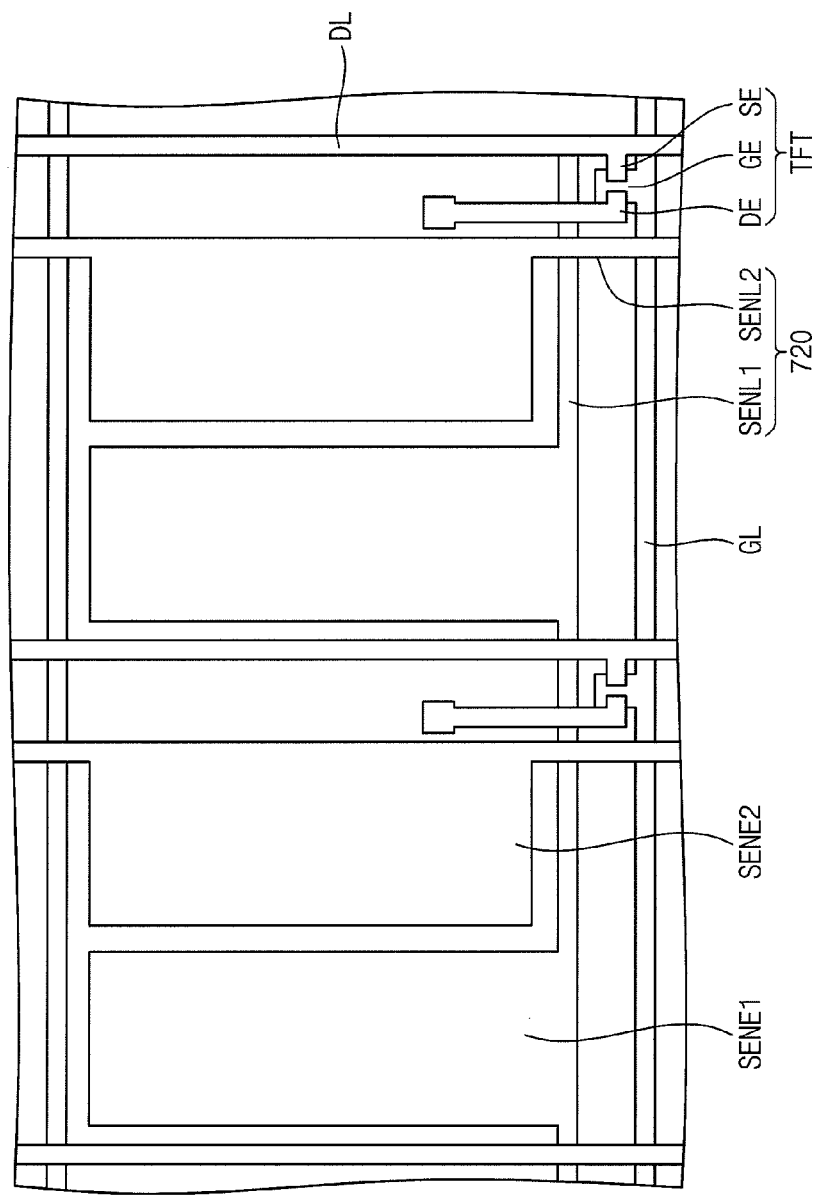
Figure 11:
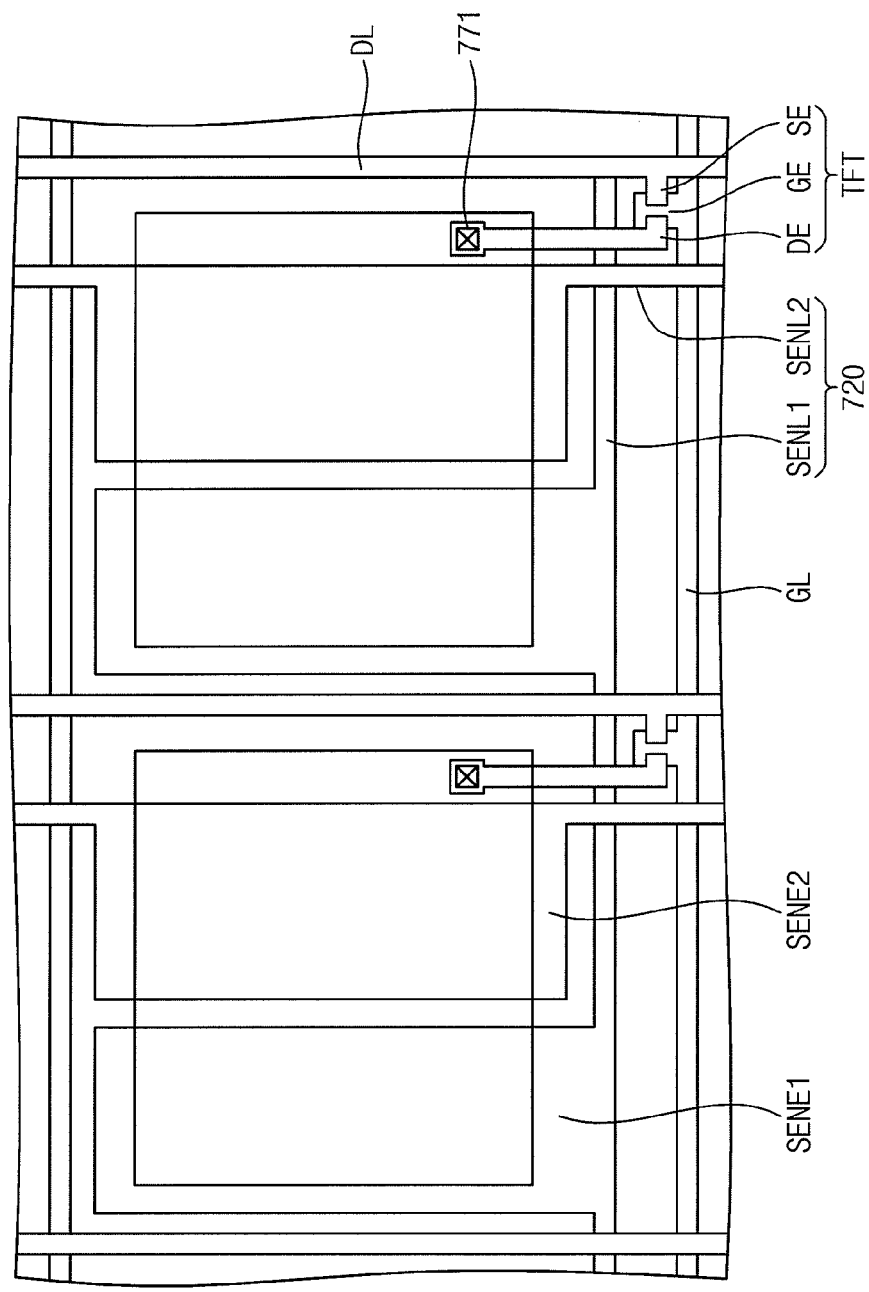
Figure 12:
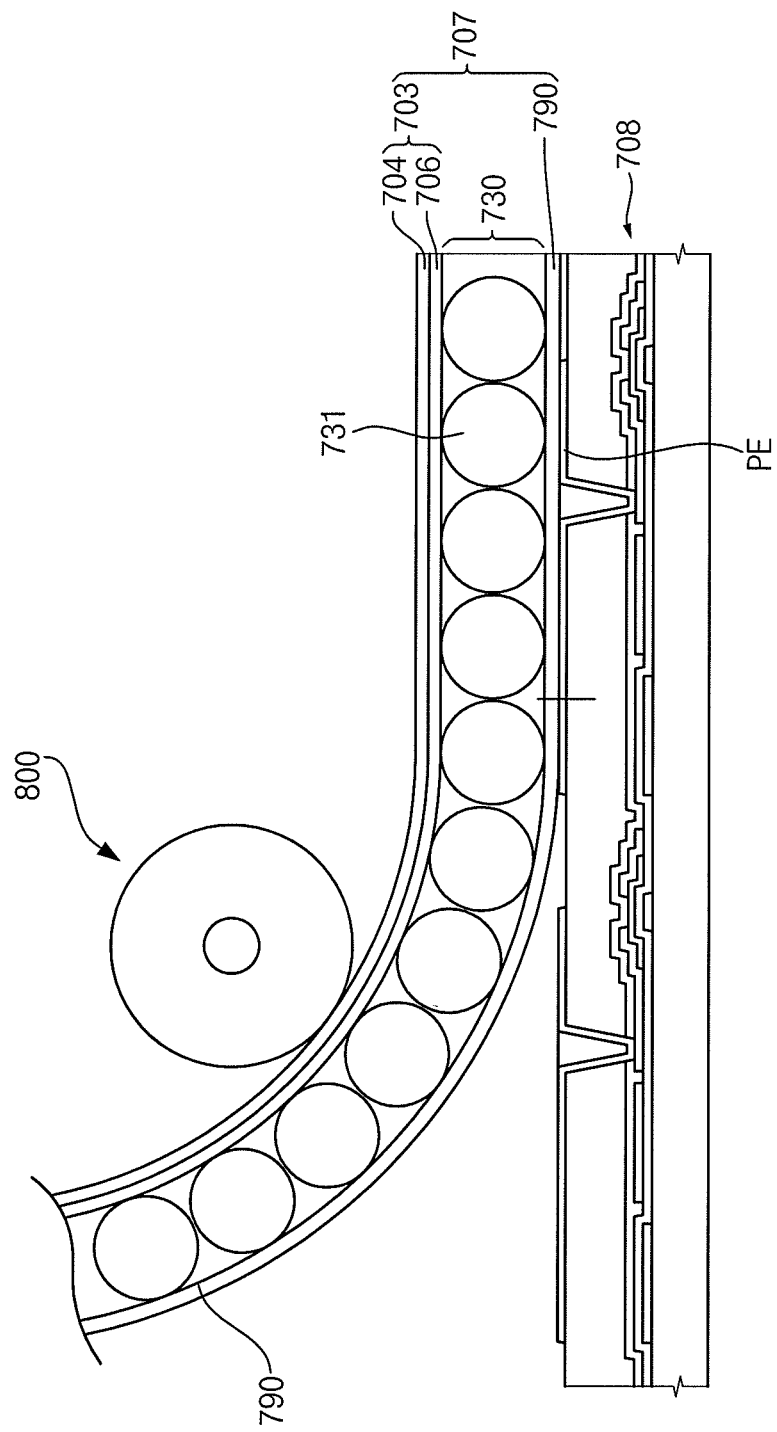
FIG. 12 is a cross-sectional view for illustrating a method of manufacturing a touch screen display device according to an exemplary embodiment of the present invention.

FIGS. 9, 10 and 11 are plan views illustrating a method of manufacturing a touch screen display device according to an exemplary embodiment of the present invention. FIG. 12 is a cross-sectional view illustrating a method of manufacturing a touch screen display device according to an exemplary embodiment of the present invention.

Referring to FIGS. 9, 10, 11 and 12, a method of manufacturing a touch screen display includes forming a display signal line on a base substrate, forming a sensing line disposed along the display signal line, forming a pixel electrode PE electrically connected to the display signal line, and laminating a display plate 707 on the base substrate.

The display plate 707 of FIG. 12 includes a front plate 703, a second protecting film 790 and a display layer 730. The front plate 703 includes a first protecting film 704 and a common electrode 706 formed on a surface of the first protecting film 704. The second protecting film 790 is disposed opposite to the first protecting film 704. The display layer 730 is disposed between the first protecting film 704 and the second protecting film 790. The display layer 730 includes a plurality of micro capsules 731 including positively and negatively charged pigment particles.

A gate metal layer is deposited on the base substrate, for example, via a sputtering process. A plurality of gate lines GL and a plurality of first sensing lines SENL1 are formed on the base substrate as illustrated in FIG. 9, for example, via a photo-lithographic process. The gate lines GL may be extended substantially parallel with each other in a row direction. The first sensing lines SENL1 are disposed between neighboring gate lines GL, and may be formed substantially parallel with the gate lines GL. The first sensing line SENL1 may be formed closer to one of the neighboring gate lines GL. A plurality of gate electrodes GE is protruded in a column direction from the gate line GL. The gate electrodes GE may be formed at regular intervals. A plurality of first sensing electrodes SENE1 protrude in a column direction from the first sensing lines SENL1. The first sensing electrodes SENE1 may be formed at regular intervals.

A gate insulating layer is formed over the gate line GL and the first sensing line SENL1. For example, a silicon nitride (SiNx) layer may be deposited to form the gate insulating layer via a plasma chemical vapor deposition. A semiconductor layer, a resistant contact layer and a source metal layer are formed over the gate insulating layer.

A plurality of data lines DL and a plurality of second sensing lines SENL2 are formed from the source metal layer as illustrated in FIG. 10, for example, via a photo-lithographic process. The resistant contact layer and the semiconductor layer may be patterned together with the data lines DL and the second sensing lines SENL2, for example, via a photo-lithographic process. The resistant contact layer and the semiconductor layer may be formed before the source metal layer is formed.

The data lines DL are extended substantially parallel with each other in a column direction in FIGS. 10 and 11. The second sensing lines SENL2 are disposed between neighboring data lines DL, and formed substantially parallel with the data lines DL. The second sensing line SENL2 stands closer to one data line DL than another neighboring data line DL. A plurality of source electrodes SE is protruded in row direction from the data lines DL. The source electrodes SE partially overlap the gate electrodes GE. A plurality of second sensing electrodes SENE2 is protruded in row direction from the second sensing lines SENL2. The first sensing electrode SENE1 and the second sensing electrode SENE2 may be separately formed from each other in the unit pixel area, or may be formed to partially overlap each other.

For improving touch sensitivity, in an exemplary embodiment of the present invention, the area of the first sensing electrode SENE1 and the area of the second sensing electrode SENE2 is increased. For example, the first sensing electrode SENE1 and the second sensing electrode SENE2 may overlap each other to enlarge areas of the electrodes to an extent that signal distortion, though induced, is maintained below a permissible value.

A drain electrode DE of a thin film transistor TFT and the second sensing electrode SENE2 may be formed at the same layer. For enlarging an area that the second sensing electrode SENE2 occupies in the unit pixel area, the gate electrodes GE, the source electrodes SE and the drain electrode DE of the thin film transistor TFT may be compactly designed.

A channel protecting layer is formed to cover the data line DL, the second sensing electrode SENE2 and the thin film transistor TFT. For example, a silicon oxide (SiOx) layer may be deposited to form the channel protecting layer via a plasma chemical vapor deposition. A contact hole 771 exposing a portion of the drain electrode DE is formed on the channel protecting layer, for example, via a photo-lithographic process.

A pixel electrode PE is formed on the channel protecting layer, for example, through depositing a transparent conductive material via a plasma chemical vapor deposition, or through depositing a metal via a sputtering process. The pixel electrode PE may be formed to overlap the first sensing electrode SENE1 and the second sensing electrode SENE2.

In an exemplary embodiment of the present invention, the data line DL, the second sensing electrode SENE2 and the pixel electrode PE are formed on the gate insulating layer. The data line DL, the second sensing electrode SENE2 and the pixel electrode PE may comprise the same material. The second sensing electrode SENE2 may be formed to extend around the edges of the pixel electrode PE, for preventing a mutual short among the drain electrode DE of the thin film transistor TFT, the second sensing electrode SENE2 and the pixel electrode PE.

A method of manufacturing a touch screen display may include forming a position data processing part. The position data processing part is electrically connected with the first sensing line SENL1 and the second sensing line SENL2. The position data processing part detects the position data of a point on the touch screen display device indicating a point touched by an external object using signals related to a change of electrostatic capacitance, which signals are transmitted from the first sensing line SENL1 and the second sensing line SENL2. The position data processing part may be integrated on the base substrate, or may be mounted on the base substrate as a chip.

Referring to FIG. 12, the display plate 707 is attached to a TFT substrate 708 formed through manufacturing processes illustrated in FIGS. 9, 10 and 11. The display plate 707 may be laminated by a laminator 800 so that the pixel electrode PE of the TFT substrate 708 and the second protecting film 790 of the display plate 707 face each other. The display plate 707 may be attached to the TFT substrate 708 by an adhesive.

According to an exemplary embodiment of the present invention, a sensing electrode sensing a change of electrostatic capacitance is configured to be large in a unit pixel area, and a touch screen display device having improved touch sensitivity may be provided.

According to an exemplary embodiment of the present invention, a display layer is attached to a base substrate on which a thin film transistor is formed, and a method of manufacturing may be simplified. In an exemplary embodiment of the present invention, the display layer displays an image via electrophoresis, reflectivity and contrast are high and the display layer is independent of a viewing angle, unlike a conventional liquid crystal display device.

In an exemplary embodiment of the present invention, power consumption may be low and an image may be sustained without a continuous supply of voltage because of a characteristic of an electric ink. In an exemplary embodiment of the present invention, costs may be reduced because a polarizing plate, an alignment layer, a liquid crystal are not necessary, unlike a conventional liquid crystal display device.

Although exemplary embodiments of the present invention have been described with reference to the accompanying drawings for the purpose of illustration, it is to be understood that the inventive processes and apparatus are not be construed as limited thereby. It will be readily apparent to those of ordinary skill in the art that various modifications to the foregoing exemplary embodiments can be made without departing from the scope of the present invention as defined by the appended claims, with equivalents of the claims to be included therein.

What is claimed:

1. A touch screen display device comprising:
 a common electrode;
 a base substrate disposed opposite to the common electrode;
 a display signal line disposed on the base substrate;
 a plurality of pixel electrodes electrically connected with the display signal line;
 a touch position sensing part disposed between the base substrate and the pixel electrodes, the touch position sensing part comprising a sensing electrode disposed in a unit pixel area and sensing a change of electrostatic capacitance between the common electrode and the sensing electrode; and
 a display layer disposed between the common electrode and the pixel electrodes, the display layer including a plurality of electrophoresis materials.

2. The touch screen display device of claim 1, wherein the electrophoresis materials comprise micro capsules comprising positively charged pigment particles and negatively charged pigment particles.

3. The touch screen display device of claim 1, wherein the display signal line includes a gate line and a data line that intersect each other on the base substrate to define the unit pixel area in which each of the pixel electrodes is disposed, and wherein
 the touch screen display device further comprises a thin film transistor electrically connected with the gate line and the data line to switch a pixel voltage to be applied to the pixel electrode.

4. The touch screen display device of claim 1, further comprising a position data processing part electrically connected with first and second sensing lines, wherein the sensing electrode comprises a first sensing electrode and a second sensing electrode, wherein the first and second sensing electrodes are disposed in the unit pixel area, wherein the first and second sensing lines are respectively connected to the first and second sensing electrodes, and wherein the position data processing part detects the position data of a point on the touch screen display device indicating a point touched by an external object using signals transmitted from the first and second sensing lines.

5. The touch screen display device of claim 4, wherein the first sensing line is formed at the same layer as the gate line, and wherein the second sensing line is formed at the same layer as the data line.

6. The touch screen display device of claim 5, further comprising:
 a gate insulating layer covering the gate line and the first sensing line;
 a channel protecting layer covering the data line, the second sensing line and the thin film transistor;
 a first protecting film on which the common electrode is formed; and
 a second protecting film disposed between the pixel electrode and the display layer, the second protecting film protecting the electrophoresis materials.

7. The touch screen display device of claim 6, wherein the pixel electrode is disposed on the channel protecting layer.

8. The touch screen display device of claim 6, wherein the pixel electrode is disposed on the gate insulating layer.

9. The touch screen display device of claim 8, wherein the data line and the pixel electrode are formed with the same material.

10. The touch screen display device of claim 4, wherein the first sensing line and the second sensing line are disposed to cross over the unit pixel area.

11. The touch screen display device of claim 10, wherein each of the first sensing electrode and the second sensing electrode overlaps the pixel electrode.

12. The touch screen display device of claim 11, wherein the first sensing electrode and the second sensing electrode partially overlap each other in the unit pixel area.

13. The touch screen display device of claim 11, wherein the first sensing electrode and the second sensing electrode are separated from each other in the unit pixel area.

14. The touch screen display device of claim 1, wherein the display signal line includes a gate line and a data line that intersect each other on the base substrate to define the unit pixel area in which each of the pixel electrodes is disposed, and wherein
 the touch screen display device further comprises a thin film transistor electrically connected with the gate line and the data line to switch a pixel voltage to be applied to the pixel electrode and a panel driving part applying a gate signal and a data signal to the thin film transistor to electrophorese the pigment particles.

15. The touch screen display device of claim 14, further comprising a short point disposed in the base substrate, the short point transmitting a common voltage outputted from the panel driving part to the common electrode.

* * * * *